United States Patent [19]

Chang et al.

[11] Patent Number: 5,665,801
[45] Date of Patent: Sep. 9, 1997

[54] HIGH MOLECULAR WEIGHT POLYESTER FLAME RETARDANT AND PROCESS FOR PREPARING THE SAME

[75] Inventors: Shinn-Jen Chang, Hsinchu; Yuung-Ching Sheen, Tainan Hsien; Rong-Shuh Chang, Hsinchu; Tsai-Wie Tseng, Hsinchu; Jen-Lien Lin, Hsinchu, all of Taiwan

[73] Assignee: Industrial Technology Research Institute, Hsinchu, Taiwan

[21] Appl. No.: 492,539

[22] Filed: Jun. 20, 1995

[51] Int. Cl.$^6$ ............... C08K 5/53; C09K 21/00; C08G 79/02
[52] U.S. Cl. ............... 524/125; 252/601; 528/167; 524/126
[58] Field of Search ............... 252/601, 609; 524/125, 126; 528/167

[56] References Cited

U.S. PATENT DOCUMENTS 4,142,904  3/1979  Walsh et al. ............... 528/167
4,214,069  7/1980  Couchoud et al. ............... 528/167
4,307,221  12/1981  Poisson et al. ............... 528/167

FOREIGN PATENT DOCUMENTS 6-248575  6/1994  Japan.

*Primary Examiner*—Cynthia Harris Kelly
*Attorney, Agent, or Firm*—Sughrue, Mion, Zinn, Macpeak & Seas

[57] ABSTRACT

The synthesis of a high-molecular weight phosphorus-containing polyester flame retardant is disclosed. A metal complex is selected as the catalyst to catalyze the addition reaction of phosphorus compounds and unsaturated dicarboxylic acids in the presence of saturated dicarboxylic acids and diols at a relatively lower temperture in one single reactor to form phosphorus-containing diacids, followed by esterification and polymerization to complete the process.

14 Claims, No Drawings

HIGH MOLECULAR WEIGHT POLYESTER FLAME RETARDANT AND PROCESS FOR PREPARING THE SAME

BACKGROUND

The present invention relates to a high-molecular weight phosphorus-containing polyester flame retardant and its synthesis.

Polymeric resins which are flame retardant and are resistant to high temperatures, can be obtained by incorporating flame retardant comonomers (flame retardant) onto the backbones of the polymers by copolymerization. As the flame retardants are chemically bonded to the polymeric backbones, they will not migrate to the surfaces of the polymeric resins during processsing, such as extruding or injection molding, and thus the flame retarding effect and physical properties are not affected. Washing fastness is also good when the polymeric resins are woven into fabrics or nonwoven fabrics. However, this method necessitates producer-treatment at increased cost.

Another method which can be customer-treated, is to coat a layer of flame retardants on fabricated articles of polymeric resins. For example, flame retardants can be coated on fabrics to render such fabrics flame resistant. However, the flame retarding effect will gradually diminish with repeated washings. That is, the washing fastness of thus treated fabrics is generally unsatisfactory.

Polymer blending is another method adopted to improve the flame reistance of polymeric resins. Polymeric resins are blended with flame retardants before they are fabricated into shaped articles, such as fibers and filaments. This method has the advantage of easy manufacture. However, organic flame retardants usually can not endure processing at an elevated temperature. For example, polyester and polyamide usually are extruded into filaments at a temperature higher than 290° C., and thus the high temperature often makes organic flame retardants degrade, resulting in breakage of filaments. If polymeric resins are blended with inorganic flame retardants, when spinning, the spinnerets will be blocked. This affects the pack pressure in spinning, resutling in a high rate of occurrence of broken and short filaments. In addition, poor compatability between polymers and flame retardants often causes the migration of flame retardants when the blend is processed, especially at elevated termperatures. The washing fastness of the fabrics is also unsatisfactory if the fabrics are prepared from flame resistant fibers by polymer blending.

Recently, phosphorus-containing and large molecular flame retardants have been developed to replace conventional halogen-containing flame retardants to meet the requiremets of low toxicity, low smoke and low migration in view of environment protection and public security. For example, CR733 of Daihachi Chemical Industry Co., Ltd, and RDP of AKZO Co., Ltd, are phosphate flame retardants having a polymerization degree of less than 15 and a molecular weight of less than 2000. However, the heat resistance of these phosphate flame retardants is still not satisfactory, and said fabrics are only suitable for adding to polymeric resins to be processed at a relative low temperature, in such applications as, for example polyurethane foams, polyurethane leathers, polyurethane paints, and flexible PVC. Phosphonic anhydride flame retardants produced by Hoechst Celanese Corp. and TOYOBO's GH flame retardants also display unsatisfactory heat resistance. And because they are reactive flame retardants, they are added to polyester resins and subject to copolymerization. The resulting copolyesters contain 0.4–0.7 wt % of phosphorus and are suitable for being spinned into flame resistant fibers or filaments. High molecular weight polyphosphoric ammoninum-containing flame retardants have been developed by Monsanto Co. and Hoechst Celanese Corp., however these ammoninum polyphosphate have poor compatability with polyester, and are only resistant to a temperature of about 200° C.

SUMMARY OF THE INVENTION

In order to improve the poor heat resistance, poor compatability and migration problems of conventional flame retardants, the inventors have found that incorporating phosphorus-containing diacid which is a reaction product of unsaturated diacid and phosphors compound having the structure:

wherein A is R or OR, where R is $C_1$–$C_{12}$ alkyl group or aromatic group; into the main chain of polyester can improve the heat resistance, compatability and reduce migration problems. This is because the resulting phosphorus-containing diacid is a reactive diacid in which the phosphorus-conatining group is grafted on the side chain, and thus even the linkages

break, the physical properties of the resultant flame retardant are not affected. However, reactive diacids having side-chained phosphorus-containing groups, for example derivatives of 6H-dibenz[1,2]oxaphosphorin-6-ylmethyl Butanedioic acid p-oxide (DOP), derivatives of phosphonic acid, and dimethyl phosphite etc, are not commerically available and should be pre-synthesized. This necessitates the investment of additional equipment for the synthesis of reactive diacids, and the separation and the purification of the resulting reactive diacids. It has been found also by the inventors that by properly selecting a metal complex serving as catalyst, high molecular weight phsophorus-containing polyesters can be manufactured by charging phosphorus compounds, unsaturated diacids, carboxyl diacids, and diols in one single reactor.

It is therefore an object the invention to provide a high-molecular weight polyester flame retardant and the process for the preparation to eliminate the low molecular weight, low heat resistance, and migration problems, and the necessity of pre-synthesis of phosphorus-containing reactive diacids.

To attain the above object, the process of the invention is conducted by feeding a metal complex, an unsaturated dicarboxylic acid and the derivatives thereof, a saturated dicarboxylic acid and the derivatives thereof, a diol, and a phosphorus compound having the structure (I) into one single reactor in single batch or two batches, and reacting at a temperature of 80°–120° C. to form a phosphorus-containing diacid. The temperature of the reactor is then raised to 170°–270° C. to initate the esterification reaction, followed by polymerization at a temperature of 245°–285° C. and a pressure less than 1.5 mmHg.

According to an aspect of the invention, the metal complex serving as catalyst is a high efficient catalyst, and thus the reaction of phosphorus compounds and unsaturated diacids can be proceeded at a low temperature without producing any by-products and in high conversion in the presence of saturated dicarboxylic acids and diols, making it possible to charge all the reactants in one single reactor and to produce high phosphorus content flame retardants.

According to another aspect of the invention, the flame retardants of the invention have good compatability with polyesters, polycarbonates, and polyamide resins, and therefore can be directly added to them before processing to form flame retardant fibers, fabrics, films, adhesives, and plastics having good properties, washing fastness and heat resistance. The flame retardants of the invention can also be added to polyurethane or unsaturated polyester resins to form flame retardant polyurethane and unsatured polyester resins.

The present invention can be more fully understood by reference to the following detailed descriptions.

DETAILED DESCRIPTION OF THE INVENTION

According to the invention, the metal complex is a complex having the structure: $MX_4$ or $H_2MX_6$ wherein M is a metal element of VIIIB group of the periodic table and X is a halogen or a compond of sulfur, oxygen and silicon. Examples of these metal complexes include but are not limited to $PtCl_4$, $NiCl_4$, $PdCl_4$, $H_2PtCl_6$, platinum divinyl tetramethyldisiloxane and platinum-cyclovinylmethyl siloxane complex. These metal complexes can be used singly or in the form of their mixture. The amount of the metal complex is between 0.003 wt % and 0.040 wt %, preferably 0.005 wt % and 0.015 wt % based on the total amount of phosphorus compounds and unsaturated dicarboxylic acids.

The phosphorus compounds suitable for use in the invention are those having the formula:

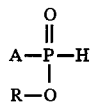

in which A is R or OR, where R is $C_1$–$C_{12}$ alkyl group or aromatic group, usually phenyl, naphthyl and biphenyl.

Unsaturated dicarboxylic acids suitable for use in the invention include but are not limited to maleic acid, fumaric acid, itaconic acid, traconic acid, mesaconic acid and aconic acid.

Saturated carboxylic diacids and the derivatives thereof suitable for use in the invention include but are not limited to terephthalic acid, isophthalic acid, adipic acid, sebacic acid, azelaic acid, dodecane dicarboxylic acid, hexahydroterephthalic acid, dimethyl terephthalate, dimethyl isophthalate, sodium salt of Dimethyl 5-sulfoisophthalate, bis(2-hydroxyethyl)-5-sulfoisophthalate sodium salt, 2,6-naphthalene dicarboxylic acid, and diesters thereof.

Diols suitable for use in the invention include but are not limited to ethylene glycol, neopentyl glycol, 1,6-hexanediol, 1,4-cyclohexane dimethanediol, polyethylene ether glycol, polytetramethylenen ether glycol or a mixture thereof.

The addition reaction of phosphorus compounds with unsaturated dicarboxylic acids can be conducted in the presence of saturated dicarboxylic acids and diols according to the process of the invention. Therefore, all the reactants and the metal complex are charged in a single reactor in one batch or two batches. The molar ratio of the phosphorus compounds to unsaturated dicarboxylic acids is 1:1 to 1:1.05, preferably 1:1.02. The molar ratio of saturated carboxylic diacids to phosphorus compounds is 5:95 to 55:45. The molar ratio of diols to the total amount of saturated dicarboxylic acids and phosphorus-containing diacids is 2.0:1.0 to 10.0:1.0, preferably 3.0:1 to 6.0:1. The addition reaction is conducted at a temperature of 80°–120° C., preferably 85°–105° C. for 3–5 hours, preferably 3.5–4 hours. After the phosphorus-containing diacids are formed, catalysts for esterification, metal oxide catalyst, such as titanium oxide, aluminum oxide, lead oxide, germanium oxide and tin oxide are added, and the temperature is raised to 170°–270° C., preferably 180°–250° C. to carry out the esterification. The amount of the metal oxide catalyst is 0.02–0.3 wt % of said phosphorus-containing diacid. At the time the conversion of the esterifcation reaches 90%, preferably 95%, polymerization takes place in the same reactor at a temperature of 245°–285° C. and a pressure less than 1.5 mm Hg to finish the process.

The high molecular weight phosphorus-containing polyester flame retardants thus preparepd have the structure:

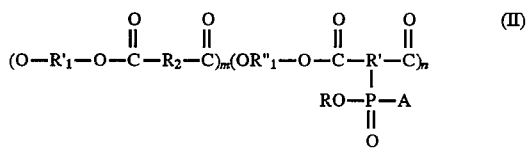

wherein $R'_1$ is $C_2$–$C_{10}$ alkylene group or aromatic group; $R''_1$ is $C_2$–$C_{10}$ alkylene group or aromatic group; $R_2$ is $C_2$–$C_{12}$ alkylene group or aromatic group; $R'$ is $C_2$–$C_{12}$ alkylene or aromatic group; A is R or OR, where R is $C_1$–$C_{12}$ alkyl group or aromatic group; m is an integer from 1 to 10; and n is an integer from 1 to 10.

The invention is more specifically described by the following illustrative examples. In these examples, the intrinsic viscosities(IV) were measured in a 3/2 solvent mixture of phenol and 1,1,2,2-tetrachloro ethane at 30° C. The phosphorus contents were obtained by heating samples in a mixture of sulfuric acid and perchloric acid to decompose, developing their colors by using ammonium molbdate and ammonium ferric sulfate, and measured by a colorimetric method. The acid values were obtained by dissolving samples in a 3/2 solvent mixture of phenol and chloroform, and titrated with 0.1N KOH/phenyl alcohol solution using phenol red as an indicator. Tm was obtained by heating 5–8 mg of samples in a Du Pont 990 DSC in which the temperature was raised from –40° C. to 300° C. at a rate of 20° C./min. Flame retardancy was indicated by LOI (Limiting Oxygen Index), and the LOI of each samples were measured according to the test standard of ASTM D2863. The percent of phosphorus incorporated into the polymer chains was confirmed by using a $^{31}$P-NMR.

EXAMPLE 1

74.78 g of DOP, 44.98 g of itaconic acid (ITA), 163 g of terephthalic acid (TPA), 249 g of ethylene glycol (EG) and 0.0078 g of $H_2PtCl_6$ were added to a 1.5 liter stainless reactor fitted with a fractionating column, stirrer, and nitrogen gas inlet, heated to a temperature of 100°–105° C. and maintained for 4 hours while stirring and purging with nitrogen gas at a flow rate of 30 ml/min. After the addition reaction was completed, the temperature was raised to 190°–230° C. to carry out the esterification reaction. After the conversion reached 90%, 0.3087 g of RSnO catalyst, 0.3087 g of TPP(Triphenyl Phosphite) thermal stabilizer were added to the reaction system and the reaction temperature was further raised to 250°–260° C. and the pressure was gradually reduced within 40 minutes to below 1 mmHg and maintained for 2 hours to yield a high molecular polyester flame retardant. The melting point was 180° C., the instrinic viscosity was 0.63, the acid value was 21.5 meq/kg. The conversion was 98%, the phosphorus content was 3.23% when assayed by $^{31}$P-NMR, the phosphorus reacted to the polyester backbones. Other properties of the resulting flame retardants are summarized in Table 1.

EXAMPLE 2

The same procedures and reaction conditions of Example 1 were repeated except that the catalyst for addition reaction was 0.0078 g of PtBr4. The properties of the resulting flame retardant are also summarized in Table 1.

EXAMPLE 3

12.30 g of dimethyl phosphonic acid, 17.0 g of itaconic acid (ITA), 122.56 g of terephthalic acid (TPA), 265.36 g of ethylene glycol (EG) and 0.0045 g of PtBr$_4$ were added to a 1.5 liter stainless reactor fitted with a fractionating column, stirrer and nitrogen gas inlet, heated to a temperature of 95°–100° C. and maintained for 4 hours while stirring and purging with nitrogen gas at a flow rate of 30 ml/min. After the addition reaction was completed, the temperature was raised to 185°–225° C. to carry out the esterification reaction. After the conversion reached 90%, 0.2872 g of RSnOZ catalyst, 0.2872 g of TPP thermal stabilizer were added to the reaction system and the reaction temperature was further raised to 245°–255° C. and the pressure was gradually reduced within 45 minutes to below 1 mmHg and maintained for 2.5 hours to give a high molecular polyester flame retardant. The melting point was 198.5° C., the instrinic viscosity was 0.6, the acid value was 18.6 meq/kg. The conversion was 96%, and the phosphorus content was 2.11% when assayed by $^{31}$P-NMR, the phosphorus reacted to the polyester main chains. Other properties of the resulting flame retardants are summarized in Table 1.

EXAMPLE 4

The same procedures and reaction conditions of Example 3 were repeated except that the catalyst for addition reaction was 0.0078 g of H$_2$PtCl$_6$. The properties of the resulting flame retardant are also summarized in Table 1.

EXAMPLE 5

16.46 g of dimethyl phosphite, 12.74 g of itaconic acid (ITA), 137.43 g of terephthalic acid (TPA), 286.8 g of ethylene glycol (EG) and 0.0034 g of PtS$_4$ were added to a 1.5 liter stainless reactor fitted with a fractionating column, stirrer and nitrogen gas inlet, heated to a temperature of 90°–95° C. and maintained for 4 hours while stirring and purging with nitrogen gas at a flow rate of 30 ml/min. After the addition reaction was completed, the temperature was raised to 180°–230° C. to carry out the esterification reaction. After the conversion reached 90%, 0.1713 g of RSnO catalyst, 0.1713 g of TPP thermal stabilizer were added to the reaction system and the reaction temperature was further raised to 245°–260° C. and the pressure was gradually reduced within 40 minutes to below 1 mmHg and maintained for 2.5 hours to yield a high molecular polyester flame retardant. The melting point was 221° C., the instrinic viscosity was 0.7, the acid value was 17.5 meq/kg. The conversion was 97.5%, and the phosphorus content was 1.494% when assayed by $^{31}$P-NMR, the phosphorus reacted to the polyester main chains. Other properties of the resulting flame retardants are summarized in Table 1.

EXAMPLES 6–8

The same procedures and reaction conditions of Example 1 were repeated except that the molar ratios of the resulting phosphorus-containing diacids were respectively 5 mole %, 12 mole % and 15 mole %. The properties of the resulting flame retardant are also summarized in Table 1.

EXAMPLE 9

74.78 g of DOP, 44.98 g of itaconic acid (ITA), 150 g of ethylene glycol (EG) and 0.0078 g of H$_2$PtCl$_6$ were added to a 1.5 liter stainless reactor fitted with a fractionating column, stirrer and nitrogen gas inlet, heated to a temperature of 100°–105° C. and maintained for 4 hours while stirring and purging with nitrogen gas at a flow rate of 30 ml/min. After the phosphorus-contianing diacids were formed, 163 g of terephthalic acid, 100 g of ethylene glycol, 0.3087 g of RSnOZ and 0.3087 g of TPP thermal stabilizer were added and the temperature was raised to 190°–230° C. to carry out the esterification reaction. After the conversion reached 95%, the reaction temperature was further raised to 250°–260° C. and the pressure was gradually reduced within 45 minutes to below 1 mmHg and maintained for 2.5 hours to yield a high molecular polyester flame retardant. The melting point was 181° C., the instrinic viscosity was 0.62, the acid value was 22.5 meq/kg. The conversion was 98%, and the phosphorus content was 3.23% when assayed by $^{31}$P-NMR, the phosphorus reacted to the polyester main chains. Other properties of the resulting flame retardants are summarized in Table 1.

EXAMPLE 10

The same procedures and reaction conditions of Example 9 were repeated except that the catalyst for addition reaction was 0.0045 g of Pt(OAc)$_2$. The properties of the resulting flame retardant are also summarized in Table 1.

COMPARATIVE EXAMPLE 1

The same procedures and reaction conditions of Example 1 were repeated except that no catalyst for addition reaction was added, and the addition reaction temperature was 160° C. The properties of the resulting flame retardant are also summarized in Table 1.

COMPARATIVE EXAMPLE 2

The same procedures and reaction conditions of Example 3 were repeated except that no catalyst for addition reaction was added, and the addtion reaction temperature was 160° C. The properties of the resulting flame retardant are also summarized in Table 1.

COMPARATIVE EXAMPLE 3

The same procedures and reaction conditions of Comparative Example 1 were repeated except that no phosphorus-containing diacid was added. The properties of the resulting flame retardant are also summarized in Table 1.

COMPARATIVE EXAMPLE 4

In this comparative example, high molecular weight polyester flame retardants were prepared by using two reactors in two batches.

Reactor A: the synthesis of phosphorus-containing diacid 216 g of DOP and 130 g of itaconic acid (ITA), were added to a 1.5 liter stainless reactor equipped with a fractionating tube, stirrer and nitrogen gas inlet, heated to a temperature of 160° C. and maintained for 1.5 hours while stirring at 60 rpm and purging with nitrogen gas at a flow rate of 40 ml/min to give a crude phosphorus-containing diacid (TP). The crude TP was purified by adding broken crude TP to 5 ml acetone and refluxing at 60° C. for 2 hours. Also, the crude TP was purified by dissolving in aceton followed by the recrystallization. The melting point of the obtained purified white phosphorus-containing diacid was 195° C. and the conversion was 80–85%.

Reactor B: the synthesis of high molecular polyester flame retardant 124.25 g of purified TP, 163 g of terephthalic acid, and 249.4 g of ethylene glycol were poured into a 1.5 liter stainless reactor equipped with a fractionating tube, stirrer and nitrogen gas inlet. The reaction mixture was heated to 180°–230° C. and maintained at this temperature while purging with nitrogen gas at a flow rate of 40 ml/min until the conversion of this esterification achieved 90%. 0.3087 g of TBT catalyst, 0.3087 g of Irganox 1010 thermal stabilizer were then added to the reaction system, and the reaction temperature was further raised to 250°–260° C. and the pressure was gradually reduced within 40 minutes to below 1 mmHg and maintained for 2 hours to give a high molecular polyester flame retardant. The melting point was 180° C., the instrinic viscosity was 0.64, the acid value was 20.8 meq/kg. The conversion was 98%, and the phosphorus content was 3.19% when assayed by $^{31}$P-NMR, the phosphorus reacted to the polyester main chains. Other properties of the resulting flame retardants are summarized in Table 1.

in terms of $T_d$ (decomposition temperature), weight loss and char % and the results are summarized in Table 2 below.

TABLE 2

|  | RDP | CR-733 | UCL-P-FR01 | UCL-P-Fr-02 |
|---|---|---|---|---|
| Td(°C.) | 351 | 345 | 417 | 435 |
| weight loss (%) ($N_2$, 3 min) | 1.2 | 2.1 | <0.1 | <0.1 |
| char (%) | 7.4 | 5.1 | 10.7 | 10.9 |

A comparison of the thermal properties of the flame retardants of the invention and CR-733 or RDP are summarized in Table 3.

TABLE 3

|  | CR-733 or RDP | UCL-P-FR01 | UCL-P-FR02 |
|---|---|---|---|
| Molecular weight (M) | <2000 | 36000 | 45000 |
| Thermal stability (TGA) (decomposition temperature) | <365° C. | >400° C. | >430° C. |
| weight loss (290° C., 3 min) | >5% | <1% | <1% |
| Appearance | viscous liquid | granular chip | granular chip |
| Application method added to | premixing and compounding PVC, PU | added just prior to processing PET, PBT, | added just prior to processing PET, PBT, |

TABLE 1

| Example | Reaction type | Metal complex | Addition Temperature (°C.) | Separation & Purification | Phosphorus content (%) | Phosphorus Conversion (%) | IV | Acid value (meq/kg) | $T_m$ (°C.) | Limiting Oxygen Index | self-extinguishing |
|---|---|---|---|---|---|---|---|---|---|---|---|
| 1 | one reactor one bach | $H_2PtCl_6$ | 100–105 | no | 3.3 | 98 | 0.63 | 21.5 | 180 | 35.4 | O |
| 2 | one reactor one batch | $PtBr_4$ | 100–105 | no | 3.3 | 97 | 0.62 | 23.2 | 180 | 35.2 | O |
| 3 | one reactor one batch | $PtBr_4$ | 95–100 | no | 2.2 | 96 | 0.65 | 20.6 | 198.5 | 34.4 | O |
| 4 | one reactor one batch | $H_2PtCl_6$ | 95–100 | no | 2.2 | 98 | 0.64 | 19.5 | 193 | 34.8 | O |
| 5 | one reactor one batch | $PtS_4$ | 90–95 | no | 1.53 | 97.5 | 0.70 | 17.5 | 221 | 33 | O |
| 6 | one reactor one batch | $H_2PtCl_6$ | 100–105 | no | 0.89 | 98 | 0.66 | 19.5 | 225 | 30 | O |
| 7 | one reactor one batch | $H_2PtCl_6$ | 100–105 | no | 1.35 | 97.5 | 0.63 | 18.3 | 218 | 32.8 | O |
| 8 | ons reactor one batch | $H_2PtCl_6$ | 100–105 | no | 1.67 | 98.2 | 0.67 | 20.5 | 213 | 33 | O |
| 9 | one reactor two batches | $H_2PtCl_6$ | 100–105 | no | 3.0 | 98 | 0.62 | 22.5 | 181 | 35.1 | O |
| 10 | one reactor two batches | $Pt(OAc)_2$ | 100–110 | no | 3.0 | 97.5 | 0.63 | 23.2 | 180 | 35.3 | O |
| comparative Example 1 | one reactor one batch | — | 160 | no | 3.3 | 79 | 0.50 | 36.5 | 165 | 34 | O |
| comparative Example 2 | one reactor one batch | — | 160 | no | 2.2 | 81 | 0.49 | 34.2 | 172 | 34 | O |
| comparative Example 3 | one reactor one batch | — | — | no | 0 | — | 0.63 | 23.2 | 253 | 22 | X |
| comparative Example 4 | two reactors two batches | — | 160 | yes | 3 | 83.3 | 0.64 | 21.3 | 180 | 35 | O |

Comparative Example 5

The thermal stabilities of the flame retardants prepared in Example 1(UCL-P-FR01) and Example 6(UCL-P-FR02) and CR-733 of Daihachi and RDP of AKZO were measured

TABLE 3-continued

| | CR-733 or RDP | UCL-P-FR01 | UCL-P-FR02 |
|---|---|---|---|
| | | TPEE, NYLON, TPAE | TPEE, NYLON, TPAE |

What is claimed is:

1. A process for preparing a high-molecular weight flame retardant polyester having the formula:

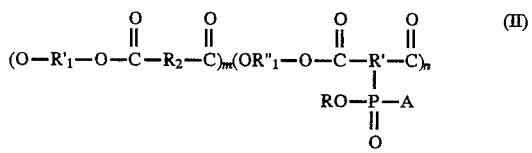

wherein $R'_1$ is a $C_2$–$C_{10}$ alkylene group or an aromatic group; $R''_1$ is a $C_2$–$C_{10}$ alkylene group or an aromatic group; $R_2$ is a $C_2$–$C_2$ alkylene group or an aromatic group; $R'$ is a $C_2$–$C_{12}$ alkylene group or an aromatic group; A is R or OR, where R is a $C_1$–$C_{12}$ alkyl group or an aromatic group; m is an integer from 1 to 10; and n is an integer from 1 to 10; comprising the following steps;

(a) feeding in a single batch or in two batches a metal complex serving as catalyst, an unsaturated dicarboxylic acid or a derivative thereof, a saturated dicarboxylic acid or a derivative thereof, a diol, and a phosphorus compound having the formula:

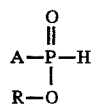

in a single reactor, and reacting at a temperature of 80°–120° C. to form a phosphorus-containing diacid;

(b) raising the temperature of the reactor to 170°–270° C. to initiate an esterification reaction; and thereafter (c) polymerizing at a temperature of 245°–285° C. and a pressure less than 1.5 mmHg to obtain the high molecular weight flame retardant polyester.

2. The process as claimed in claim 1, wherein said metal complex has a structure: $MX_4$ or $H_2MX_6$ wherein M is a metal element of VIIIB group of the periodic table and X is a halogen or a compond of sulfur, oxygen or silicon.

3. The process as claimed in claim 2, wherein said metal complex is selected from the group consisting of $PtCl_4$, $NiCl_4$, $PdCl_4$, $H_2PtCl_6$, platinum divinyl tetramethyldisiloxane and platinum-cyclovinylmethyl siloxane complex.

4. The process as claimed in claim 1, wherein said unsaturated dicarboxylic acid is selected from the group consisting of maleic acid, fumaric acid, itaconic acid, traconic acid, mesaconic acid, and aconic acid.

5. The process as claimed in claim 1, wherein said saturated dicarboxylic acid or a derivative thereof is selected from the group consisting of terephthalic acid, isophthalic acid, adipic acid, sebacic acid, azelaic acid, dodecane dicarboxylic acid, hexahydroterephthalic acid, dimethyl terephthalate, dimethyl isophthalate, sodium salt of dimethyl 5-sulfoisophthalate, bis(2-hydroxyethyl)-5-sulfoisophthalate sodium salt, 2,6-naphthalene dicarboxylic acid, and a diester thereof.

6. The process as claimed in claim 1, wherein said diol is selected from the group consisting of ethylene glycol, neopentyl glycol, 1,6-hexanediol, 1,4-cyclohexane dimethanediol, polyethylene ether glycol, polytetramethylene ether glycol and a mixture thereof.

7. The process as claimed in claim 1, wherein step (a) said reacting is at 85°–105° C.

8. The process as claimed in claim 1, wherein step (b) said esterification is at 180°–250° C.

9. The process as claimed in claim 1, wherein in the esterification of step (b) the molar ratio of diol to the total amount of saturated dicarboxylic acid and phosphorus-containing diacid is 2.0:1 to 10:1.0.

10. The process as claimed in claim 1, wherein the molar ratio of phosphorus-containing compound to unsaturated dicarboxylic acid is 1:1 to 1:1.05.

11. The process as claimed in claim 10, wherein the molar ratio of phosphorus-containing compound to unsaturated dicarboxylic acid is 1:1.02.

12. The process as claimed in claim 1, wherein in step (b) the esterification is in the presence of a metal oxide catalyst selected from the group consisting of titanium oxide, aluminum oxide, lead oxide, germanium oxide and tin oxide.

13. The process as claimed in claim 12, wherein the amount of the metal oxide catalyst is 0.02–0.3 wt % of said phosphorus-containing diacid.

14. A high molecular weight flame retardant polyester having the formula:

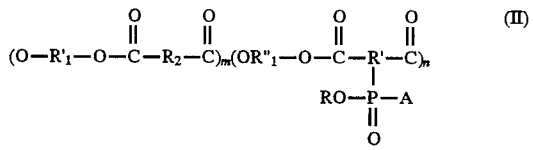

wherein $R'_1$ is a $C_2$–$C_{10}$ alkylene group or an aromatic group; $R''_1$ is a $C_2$–$C_{10}$ alkylene group or an aromatic group; $R_2$ is a $C_2$–$C_{12}$ alkylene group or an aromatic group; $R'$ is a $C_2$–$C_{12}$ alkylene or an aromatic group; A is R or OR, where R is a $C_1$–$C_{12}$ alkyl group or an aromatic group; m is an integer from 1 to 10; and n is an integer from 1 to 10.

* * * * *